Feb. 10, 1959  E. B. NOLT  2,872,772
ADJUSTABLE WIND-GUARD FOR BALER PICK-UP
Original Filed Oct. 30, 1951  2 Sheets-Sheet 1
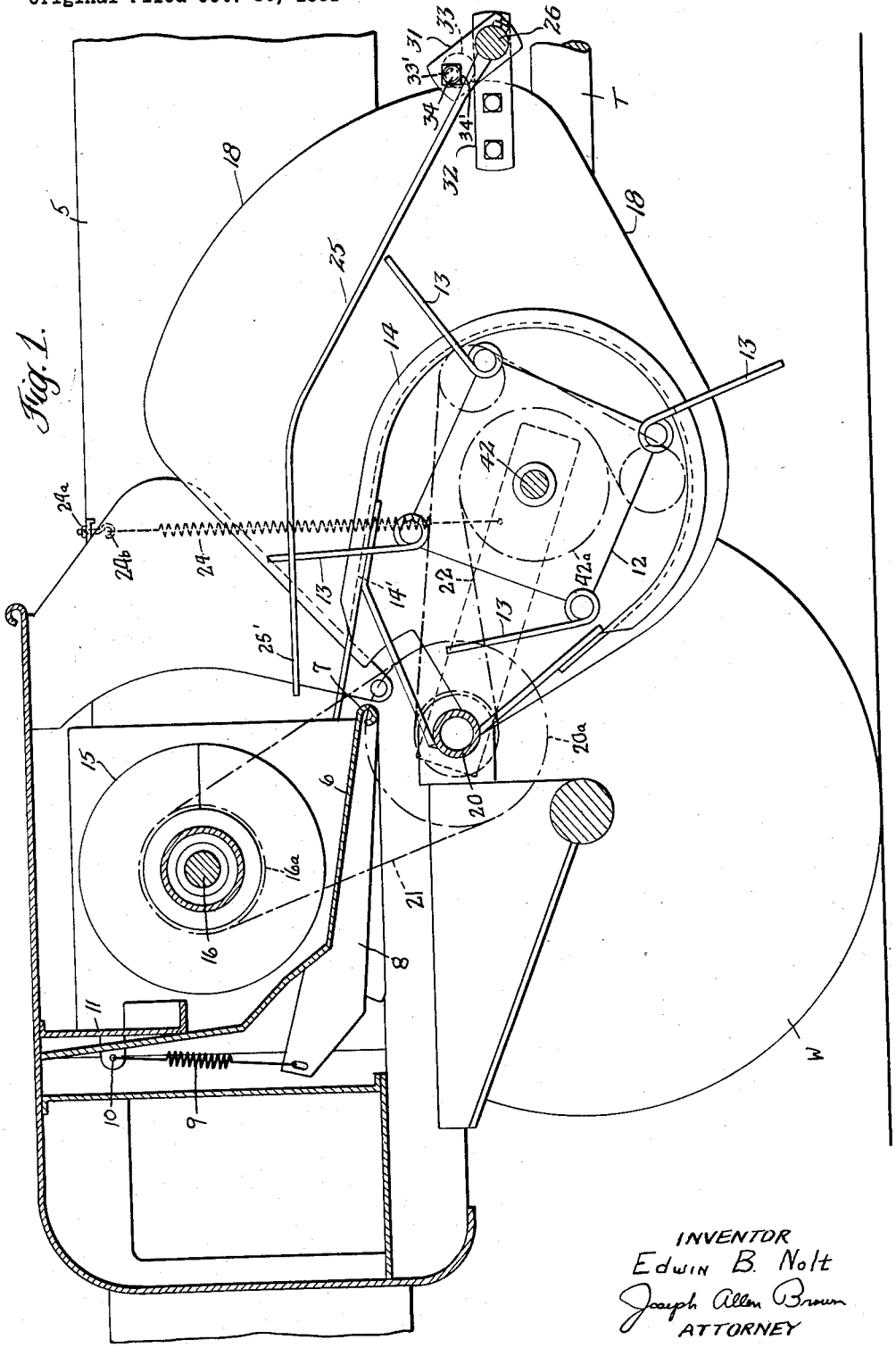
INVENTOR
Edwin B. Nolt
Joseph Allen Brown
ATTORNEY

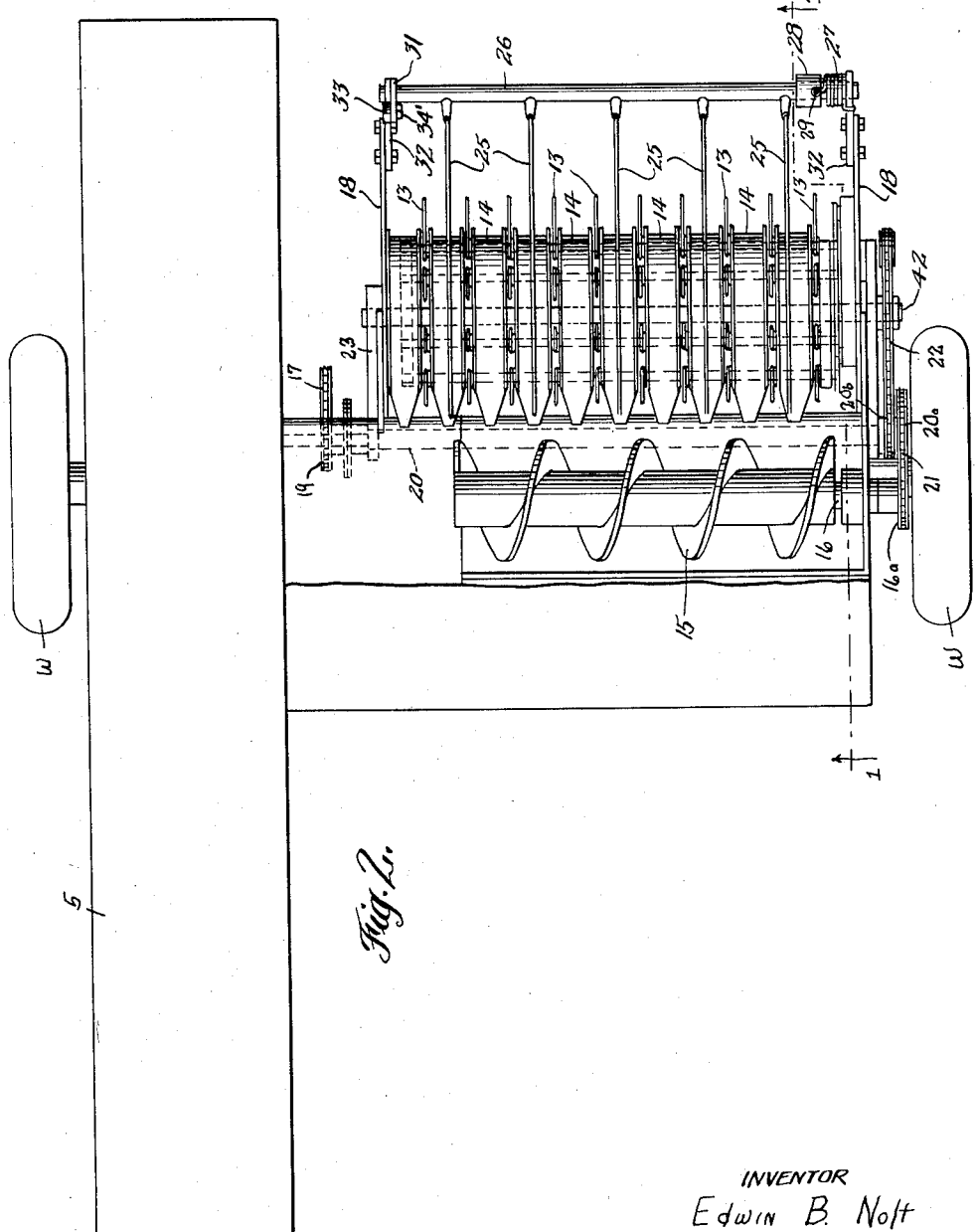

United States Patent Office 2,872,772
Patented Feb. 10, 1959

2,872,772
ADJUSTABLE WIND-GUARD FOR BALER PICK-UP

Edwin B. Nolt, New Holland, Pa., assignor to Sperry Rand Corporation, New Holland, Pa., a corporation of Delaware Original application October 30, 1951, Serial No. 253,783, now Patent No. 2,757,602, dated August 7, 1956. Divided and this application February 23, 1956, Serial No. 567,342

3 Claims. (Cl. 56—364)

The present invention relates generally to hay balers, and more particularly to wind-guard means for the pick-up mechanism of a hay baler. This application is a division of my parent application, Serial No. 253,783, filed October 30, 1951, now U. S. Patent No. 2,757,602.

Conventional hay balers are provided with a pick-up reel which lifts cut hay off the ground and feeds its rearwardly over a pick-up floor to an infeed mechanism, such as an auger, which conveys the hay transversely toward a bale chamber. It has been customary to provide the pick-up mechanism with wind-guards which hold down the hay as it is being fed rearwardly to prevent the hay from being blown off the pick-up floor. Such guards also serve to channel the hay to the feed means, the hay having to pass through the space between the pick-up floor and the wind-guards.

It is desirable to allow the operator of the baler to set the spacing between the pick-up floor and the wind-guards according to prevailing conditions and the type of crop being baled so that optimum feeding of the material to be baled may be obtained. Further, it is desirable to have means whereby the baler operation can adjust the hold-down force exerted by the wind-guards.

The primary object of this invention is to provide a wind-guard mounting having means whereby the wind-guards may be quickly and easily adjusted relative to the pick-up floor over which they extend to vary the space between these parts.

Another object of this invention is to provide simple means whereby the resilient hold-down force of the wind-guard rods can also be varied, as desired.

A further object of this invention is to provide adjusting means of the character described which is of such simplicity that the wind-guard supporting structure can be manufactured at practically the same cost as wind-guard structures having no adjusting means.

Other objects of this invention will be apparent hereinafter from the specification and from the recital in the appended claims.

In the drawings:

Fig. 1 is a part side elevation, part section of the pick-up mechanism of an automatic hay baler having wind-guard supporting means constructed according to this invention, the section being taken generally on the lines 1—1 of Fig. 2 and looking in the direction of the arrows; and Fig. 2 is a plan view, in reduced scale, of the mechanism shown in Fig. 1.

Referring now to the drawings, the baler shown therein is supported on wheels W; and it is provided with a tongue T (Fig. 1) for hitching the baler to a tractor so that it may be towed through a field of cut and windrowed hay, or other crop material. A pick-up mechanism, mounted on the right-hand side of the baler, as it moves through the field, lifts the hay from the stubble to begin its conveyance into a bale chamber 5. Reciprocable in bale chamber 5 is a plunger (not shown) which compresses the hay fed into the chamber into bales and forces the bales rearwardly as they are formed (to the left of Figs. 1 and 2). Upon completion of each bale, it is automatically banded and tied. Thereafter, the bales are ejected onto the ground or onto a trailing vehicle.

The pick-up mechanism comprises a rotatable reel 12 mounted on a shaft 42. Reel 12 carries a plurality of tines 13 moveable between arcuate stripper plates 14 to lift cut hay from the ground and deliver it rearwardly over tangential extensions 14' of the stripper plates to an auger 15. Auger 15 is mounted on a shaft 16 and is operative to feed the hay transversely toward bale chamber 5. Pusher and wadboard means conveys the hay, after it leaves the auger, into bale chamber 5 in timed relation to the reciprocation of the plunger therein. Such structure is fully described in my parent application previously referred to.

Disposed beneath and extending upwardly behind auger 15 is a guide plate 6 which is preferably resiliently floatably mounted to be capable of moving away from the auger under the influence of large masses of hay, or other crop material, passing between the auger and plate 6. This is for the purpose of enabling the auger to handle large concentrations or masses of crop material without being jammed.

To this end the forward end of plate 6 is hinged as at 7 to the fixed horizontal bottom of the infeed housing for swinging movement about a horizontal axis. A rigid arm 8 carried on plate 6 and projecting rearwardly beneath the plate is connected by means of a tension spring 9 to a bracket 10 fixed to a supporting hanger 11. Thus, spring 9 will tend to resiliently urge the plate toward the auger.

Extending parallel to the axis of auger 15 and reel 12 is a shaft 20 driven by an endless chain 17 (Fig. 2) trained around a sprocket 19 fixed on the end of shaft 20 adjacent bale chamber 5. Chain 17 is driven from a source of power, not shown. Shaft 20 has a sprocket 20a at its end remote from bale chamber 5. Trained over this sprocket and a sprocket 16a on auger shaft 16 is an endless chain 21 which transmits the drive force to auger 15. A second sprocket 20b is mounted on shaft 20 inwardly of sprocket 20a. Trained over this sprocket and a sprocket 42a on the shaft 42 of reel 12 is an endless chain 22 which supplies the drive for the pick-up reel.

To prevent the picked up hay from escaping laterally and off the floor formed by stripper plates 14, the pick-up mechanism is provided with side walls 18—18 which are mounted on arms 23 (Fig. 2) suitably connected to drive shaft 20 to turn about the axis of the shaft. The pick-up is suspended from a vertically hanging spring 24 connected at its upper end to a portion of the baler frame and at its other end to the supporting structure for reel 12. The tension of spring 24 is adjustable by means of a nut 24a on the threaded shank of a hook 24b so that the pick-up normally floats at a level such that tines 13 just clear the ground on their sweeping, pick-up strokes.

The hold down the hay as it moves over stripper plates 14 wind-guard rods 25 are provided which extend from the front of the pick-up rearwardly, with their free ends 25' pointing toward and terminating near auger 15. Rods 25 are welded, bolted or otherwise secured to a bar 26 pivotally supported at its ends in stud or support arms 32 bolted to side walls 18.

The end of bar 26 adjacent bale chamber 5 has a lever arm 31 welded to it which is spaced from the adjacent stud arm 32 only a sufficient distance to provide a clearance between the parts. Arm 31 has a cam or stop member 33 adjustably connected to it by a bolt 34 and a nut 34'. As shown in Fig. 1, cam member 33 is in the form of a circular plate, the bolt 34 extending through an eccentric bore 33' in the plate. Cam member 33 overlies and engages arm 32 which provides a fixed abutment cooperative with the cam to control the angular relationship between lever 31 and the adjacent stud arm and thereby the relative pivotal position of bar 26 in the stud arm.

Wind-guard rods 25 are resiliently biased downwardly toward stripper plates 14 by a coil spring 27 mounted on the end of bar 26 opposite lever 31. One end of the spring is connected to the adjacent stud arm 32 and its opposite end to a collar 28 connected to bar 26 by a removeable pin 29.

When hay of large volume is fed under rods 25, an upward force is directed against the rods. The rods remain stationary until the force against them is sufficient to overcome the biasing force of spring 27, whereupon the rods move upwardly. All the while, the rods exert a hold-down force on the hay being fed over stripper plates 14 and prevent it from being blown out of the pick-up by the wind.

To alter the hold-down force exerted by wind-guard rods 25, the baler operator merely removes pin 29 connecting collar 28 to bar 26 and then either coils-up or loosens spring 27, replacing the pin when a desired spring adjustment has been obtained. To vary the spacing between the free ends 25' of wind-guard rods 25 and the pick-up floor, he merely loosens nut 34' and adjusts cam 33 to the desired position.

From the above, it will be seen that applicant has provided a readily adjustable wind-guard structure of utmost simplicity and the fewest possible number of parts. The baler operator is able to adjust the wind-guards as he desires in a minimum amount of time and with few tools.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. Windguard means for holding down material on the floor of a pick-up having a pair of spaced side walls, comprising a pair of forwardly projecting support arms, one connected to each side wall, a bar supported at its ends in said support arms for pivotal movement about a fixed longitudinal axis, a plurality of rods carried on said bar and extending rearwardly over said pick-up, each of said rods having a free end spaced from said floor, and means for selectively limiting the pivotal movement of said bar in one direction to thereby regulate the space between said free ends and said floor, said means comprising a cam member, and means connecting said cam member to said bar in one of a plurality of selective positions, said cam member being engageable with one of said support arms on pivotal movement of said bar in said one direction, the portion of said cam member engaging said support arm varying according to the selective position of adjustment of the member.

2. Windguard means for holding down material on the floor of a pick-up having a pair of spaced side walls, comprising a pair of forwardly projecting support arms, one connected to each side wall, a bar supported at its ends in said support arms for pivotal movement about a fixed longitudinal axis, a plurality of rods carried on said bar and extending rearwardly over said pick-up, each of said rods having a free end spaced from said floor, and means for selectively limiting the pivotal movement of said bar in one direction to thereby regulate the space between said free ends and said floor, said means comprising a lever rigidly affixed to said bar and extending radially relative thereto adjacent one of said support arms, a cam member, means connecting said cam member to said lever in one of a plurality of selective positions, said cam member being engageable with said one support arm on pivotal movement of said bar in said one direction, the portion of said cam member engaging said support arm varying according to the selective position of adjustment of the member.

3. Windguard means for holding down material on the floor of a pick-up having a pair of spaced side walls, comprising a pair of forwardly projecting support arms, one connected to each side wall, a bar supported at its ends in said support arms for pivotal movement about a fixed longitudinal axis, a plurality of rods carried on said bar and extending rearwardly over said pick-up, each of said rods having a free end spaced from said floor, and means for selectively limiting the pivotal movement of said bar in one direction to thereby regulate the space between said free ends and said floor, said means comprising a lever having one end rigidly affixed to said bar and extending radially relative thereto adjacent one of said support arms, a bolt projecting through the opposite end of said lever and over said one support arm, a cam member mounted on said bolt for rotatable adjustment relative thereto and engagement with said support arm, said cam member comprising a circular plate having an eccentric bore through which said bolt extends, and a nut threadable on said bolt to lock said cam member in a desired position of rotatable adjustment.

References Cited in the file of this patent

UNITED STATES PATENTS

| | | |
|---|---|---|
| 2,391,763 | Anderson | Dec. 25, 1945 |
| 2,430,734 | Raney et al. | Nov. 11, 1947 |
| 2,524,233 | Russell | Oct. 3, 1950 |
| 2,703,957 | Russell | Mar. 15, 1955 |
| 2,713,762 | Clausen | July 26, 1955 |